B. R. BENJAMIN.
MACHINE FOR FORMING OPENINGS IN WOVEN FABRICS.
APPLICATION FILED JULY 26, 1912.
1,157,754. Patented Oct. 26, 1915.
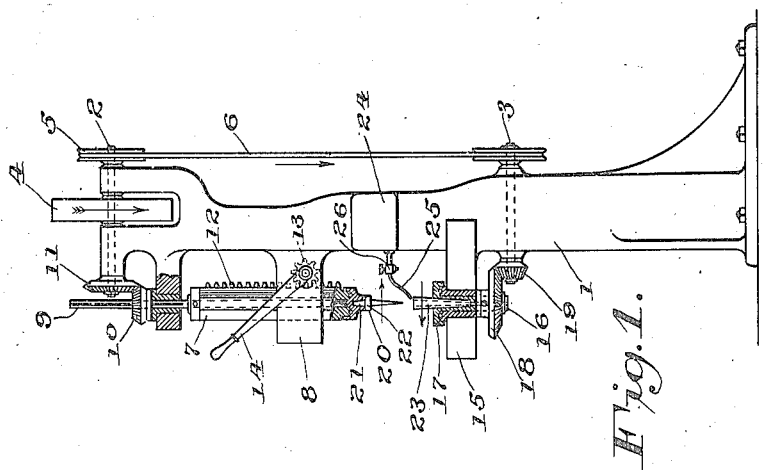
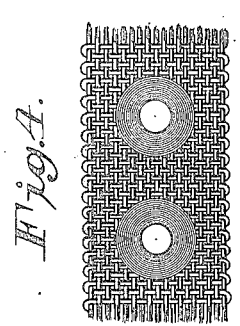
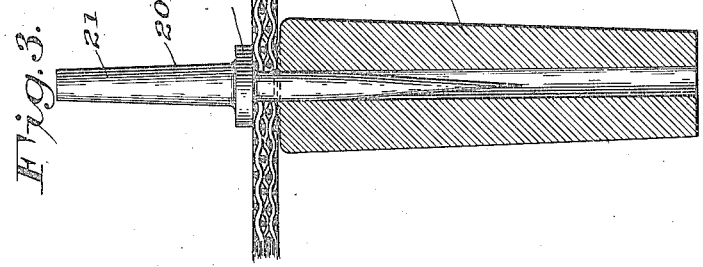
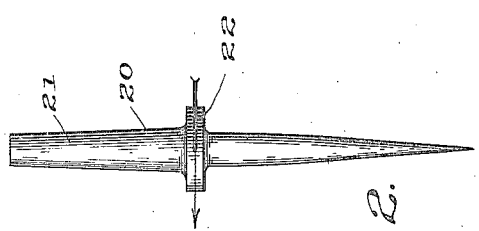
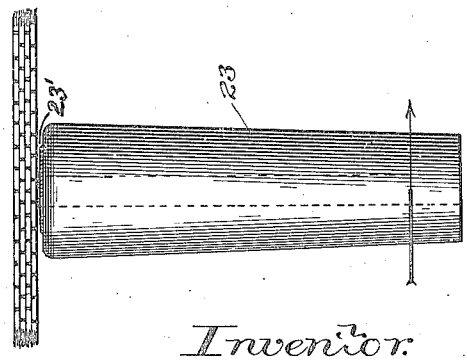
Witnesses:
C. C. Palmer
F. W. Hoffmeister
Inventor:
Bert R. Benjamin,
By E. W. Burgess
Attorney

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

MACHINE FOR FORMING OPENINGS IN WOVEN FABRICS.

1,157,754.            Specification of Letters Patent.     Patented Oct. 26, 1915.

Application filed July 26, 1912. Serial No. 711,617.

*To all whom it may concern:*

Be it known that I, BERT R. BENJAMIN, a citizen of the United States, residing at Oak Park, in the county of Cook and State of Illinois, have invented certain new and useful Improvements in Machines for Forming Openings in Woven Fabrics, of which the following is a specification.

My invention relates to machines for forming openings in woven fabrics, and in particular to a novel mechanism for puncturing same in a manner whereby the threads thereof remain unbroken and the openings therein retain their original form permanently; the object of my invention being to provide a woven fabric in the form of belting or straps with openings adapted to receive the tongue members of buckles in the same way as the holes in ordinary leather straps.

These objects are attained by means of mechanism, one embodiment of which is illustrated in the accompanying drawings, in which—

Figure 1 is a side elevation, partly in section, of a machine designed to puncture fabric in a manner following the method to be described; Fig. 2 is a detached detail of Fig. 1, on an enlarged scale and designed to illustrate the operation of the puncturing mechanism; Fig. 3 is a view similar to Fig. 2, and representing the fabric as pierced by the puncturing mechanism; and Fig. 4 is a view showing a sample of the woven fabric provided with openings made according to my method.

The same reference numerals designate like parts throughout the several views.

1 represents the frame of the machine, having a primary power transmitting shaft 2 journaled upon the upper end thereof, and a second shaft 3 near the lower end, motion being transmitted to shaft 2 by means of a pulley 4, and from shaft 2 to shaft 3 by means of pulley 5 and belt 6.

7 represents a sliding head carried by an arm 8, forming part of the frame 1, and having a spindle 9 journaled therein.

10 represents a pinion connected with the upper end of the spindle in a manner to transmit motion thereto and permit the spindle to slide axially therethrough, the pinion deriving motion through bevel gear wheel 11 secured to the shaft 2. The movement of the sliding head 7 is controlled in a common way by means including a toothed rack 12 carried thereby, a pinion 13 journaled upon arm 8 and connected with a hand lever 14.

15 represents a bed member integral with frame 1 and having journaled thereon a shaft 16 in axial alinement with the spindle 9, having a cap member 17 at the upper end thereof, and 18 represents a bevel gear wheel secured to the lower end of the shaft and engaging with a pinion 19 secured to shaft 3, whereby the shaft is rotated in a direction opposite to that of the spindle.

20 represents a tapering pointed puncturing member having a shank 21 that is received by a socket formed in the lower end of spindle 9, and a collar portion 22 at the base of the shank, and 23 represents a tapering tubular member received by an axial bore in shaft 16 and adapted to receive the tapering puncturing member 20.

It is desirable that a viscous fluid be applied to the fabric at the point of engagement with the puncturing instrument, and for a supply of such fluid there is provided a receptacle 24 carried by the frame of the machine and having a feed pipe 25 leading therefrom to the desired position, the feed of fluid being controlled by means of a valve 26.

In operation the fabric is placed upon the tubular member 23, that is provided with a raised portion 23¹ at the upper end thereof that corresponds with the lower surface of the collar 22, and the rotating puncturing member 20 is brought in contact therewith and passed through the material, crowding the warp and weft threads laterally, and simultaneously with the operation a viscous fluid, as glue or sizing, flows toward the opening being formed, and when the collar 22 reaches the surface of the fabric the pressure is continued and the fabric is held for a period between the oppositely revolving members 20 and 23, resulting in a permanent opening being formed having a surrounding smooth surface, as shown in Fig. 4.

While I have in this application specifically described one embodiment which my invention may assume in practice, it is, of course, to be understood that the form thereof shown for purposes of illustration may be modified without departing from the spirit of my invention, and that I intend to cover herein all such modifications falling within the scope of the invention as outlined in the appended claims.

What I claim as my invention, and desire to secure by Letters Patent, is:

1. In a machine for puncturing woven fabric, a pointed puncturing member, and means for compressing the fabric around the edge of the puncture made thereby.

2. In a machine for puncturing woven fabric, a pointed puncturing member, and means engaging the opposite sides of the fabric for compressing the latter around the edges of the puncture made by said member.

3. In a machine for puncturing woven fabric, a pointed puncturing member, means for compressing the fabric around the edges of the puncture made thereby, and means for supplying liquid thereto.

4. In a machine for puncturing woven fabric, a pointed puncturing member, rotating means for compressing the fabric around the edges of the puncture made thereby, and means for supplying liquid thereto.

5. In a machine for forming openings in woven fabrics, a pointed spreading member, a coöperating member adapted to receive and encircle the same, and means for imparting rotation to one of said members.

6. In a machine for forming openings in woven fabrics, a spreading member, a coöperating member adapted to receive and encircle the same, and means for imparting rotation to one of said members and a longitudinal movement to the other thereof.

7. In a machine for forming openings in woven fabrics, a spreading member, a coöperating member adapted to receive the same, and means for simultaneously rotating said members and moving one of the same longitudinally relatively to the other.

8. In a machine of the class described, a pointed puncturing member, a coöperating member adapted to receive and snugly encircle the portion of the same protruding through the fabric, and means for imparting rotation to one of said members.

9. In a machine of the class described, a pointed puncturing member, a work holder, a coöperating member carried thereby adapted to receive the portion of the puncturing member extending through the material, and means for imparting a relative rotary and longitudinal movement to said members.

10. In a machine of the class described, a frame, a pointed puncturing member reciprocably mounted thereon, a rotatable work holder on said frame, and a coöperating member carried on said work holder receiving and snugly encircling the portion of said puncturing member extending through the material punctured.

11. In a machine of the class described, a pointed puncturing member having a laterally disposed, material-engaging shoulder at the end of its puncturing portion, and a coöperating tubular member adapted to receive and encircle so much of said puncturing member as extends through the material having a corresponding shoulder thereon engageable with the opposite side of the material.

12. In a machine of the class described, a pointed puncturing member having means for compressing the material punctured around the periphery of the puncture, and a coöperating member adapted to receive and encircle the portion of the puncturing member extending through the material having corresponding means for compressing the material when the two members are brought together.

13. In a machine of the class described, a pointed puncturing member having means for compressing the material punctured around the periphery of the puncture, a coöperating member adapted to receive and encircle the portion of the puncturing member extending through the material having corresponding means for compressing the material when the two members are brought together, and means for rotating and reciprocating certain of said members.

14. In a machine of the class described, a pointed puncturing member having means for compressing the material punctured at points around the puncture, a coöperating member adapted to receive and encircle the portion of the puncturing member extending through the material having corresponding means for compressing the material when the two members are brought together, and means for supplying fluid to said material during the puncturing operation.

15. A mechanism for forming openings in woven fabrics including, in combination, a rotatable, longitudinally movable, pointed puncturing member adapted to be passed through the fabric, and a rotatable tubular member opposing said puncturing member and in axial alinement therewith.

16. A mechanism for forming openings in woven fabric including, in combination, a rotatable, longitudinally movable, pointed puncturing member adapted to be passed through the fabric, a rotatable tubular member opposing said puncturing member and in axial alinement therewith, and means for rotating said puncturing and tubular members in opposite directions.

17. A mechanism for forming openings in woven fabric including, in combination, a rotatable, longitudinally movable, pointed puncturing member adapted to be passed through the fabric and provided with a collar upon the body portion thereof that contacts with the surface of the fabric, a rotatable tubular member opposing said puncturing member, in axial alinement therewith, and having a raised portion that contacts with the opposite surface of the fabric, and means for rotating said puncturing and tubular members in opposite directions.

18. A mechanism for forming openings in woven fabrics including, in combination, a rotatable, longitudinally movable, pointed puncturing member adapted to be passed through the fabric, a rotatable tubular member opposing said puncturing member and in axial alinement therewith, and means for applying a viscous fluid to said members during the operation thereof.

19. In a machine for forming openings in woven fabrics, rotating means for spreading an opening in the fabric, and means for supplying liquid to the fabric around the opening to maintain the opening.

20. In a machine for forming openings in woven fabrics, rotating means for spreading an opening in the fabric, and means for setting the fabric around the opening.

BERT R. BENJAMIN.

Witnesses:
RAY D. LEE,
V. D. LAWLER.